March 6, 1928.

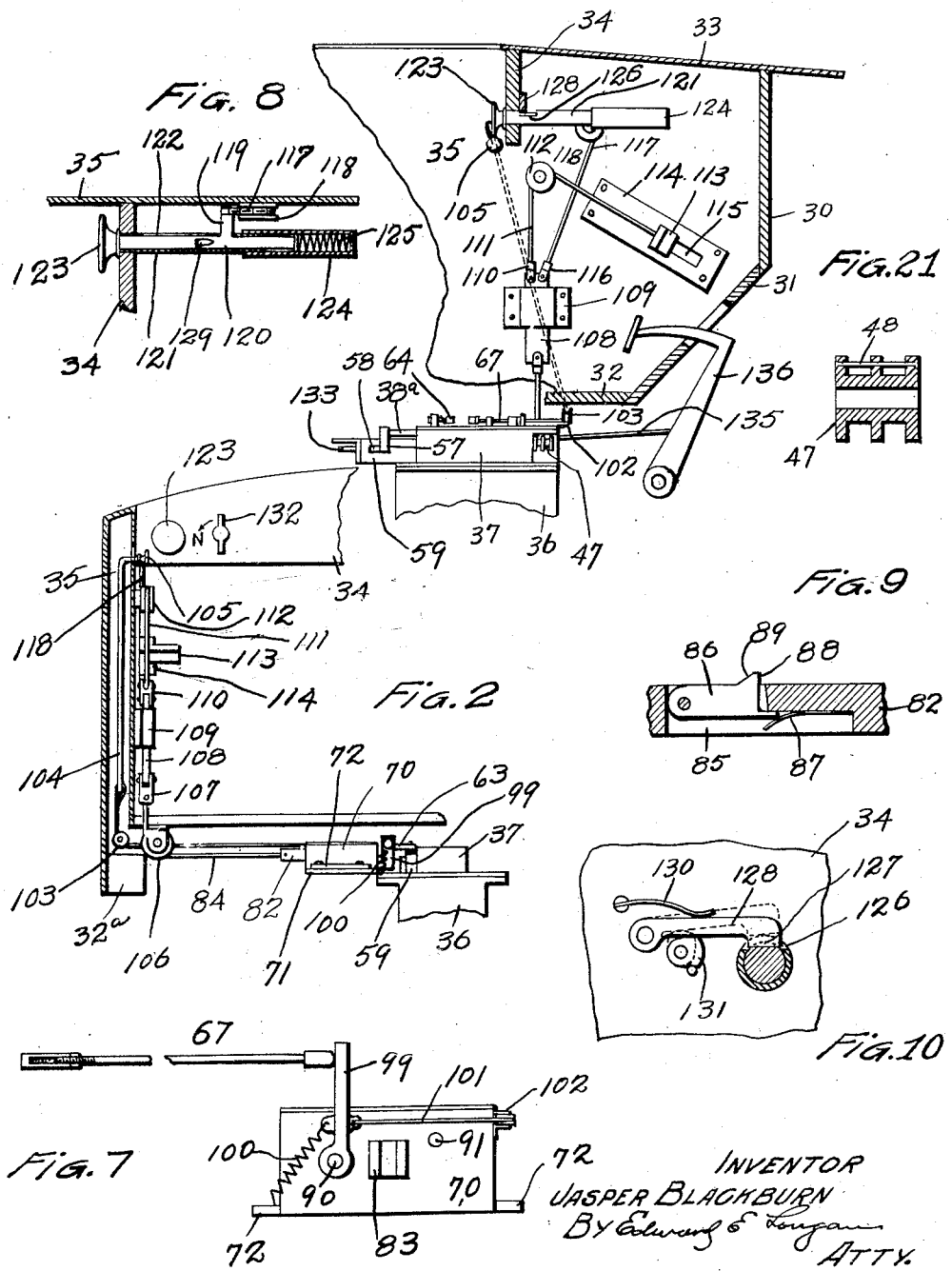

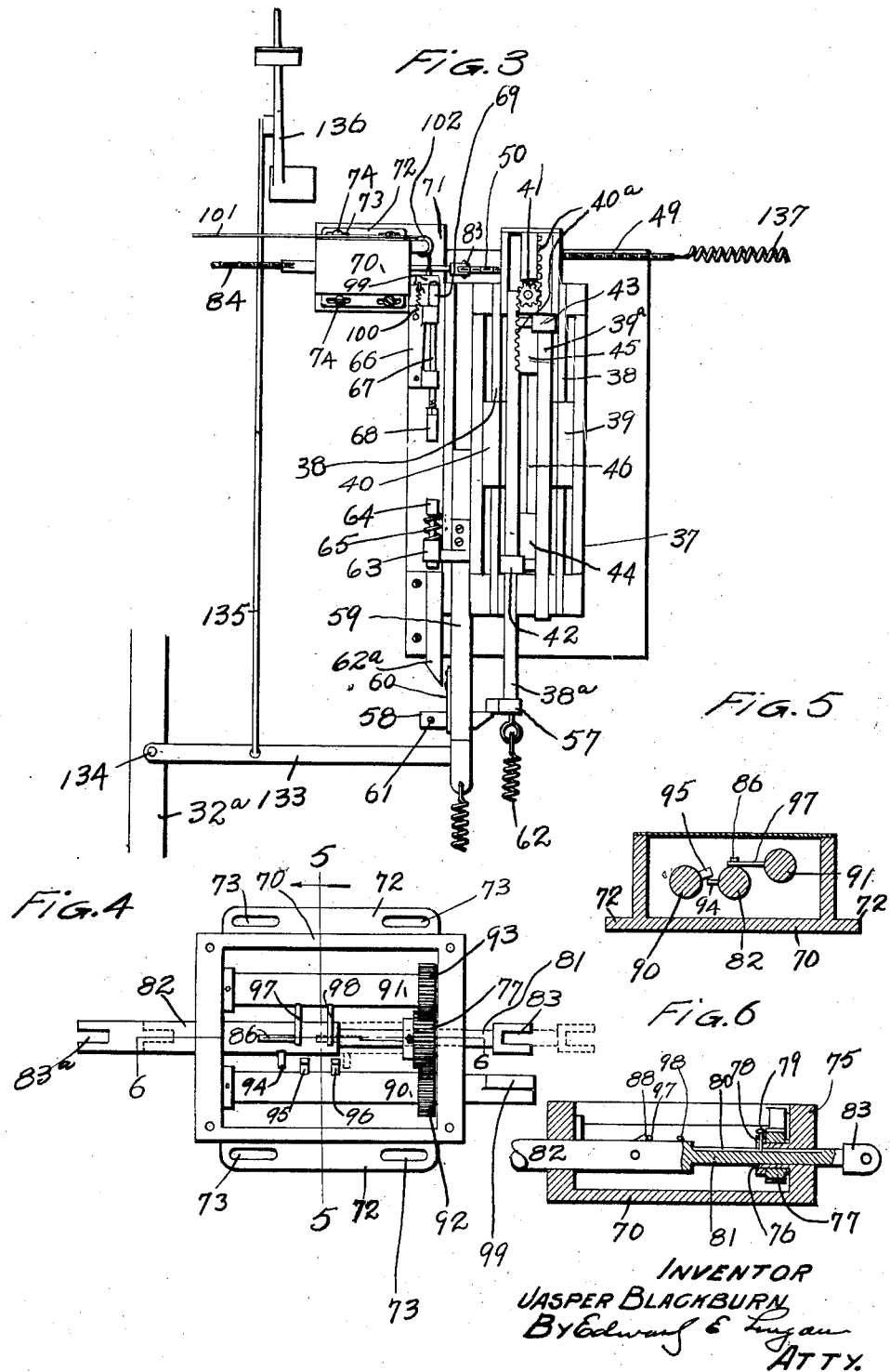

J. BLACKBURN 1,661,992

AUTOMATIC PRESELECTOR AND SHIFTING DEVICE FOR SLIDING GEAR TRANSMISSIONS

Filed Sept. 14, 1925  3 Sheets-Sheet 3

INVENTOR
JASPER BLACKBURN
BY Edward E. Longan
ATTY

Patented Mar. 6, 1928.

1,661,992

UNITED STATES PATENT OFFICE.

JASPER BLACKBURN, OF WEBSTER GROVES, MISSOURI.

AUTOMATIC PRESELECTOR AND SHIFTING DEVICE FOR SLIDING GEAR TRANSMISSIONS.

Application filed September 14, 1925. Serial No. 56,252.

My invention relates to improvements in automatic preselectors and shifting devices for sliding gear transmissions, and has for its primary object a sliding gear transmission which is provided with an automatic preselector, so that upon the completion of the shift to one speed, the next higher speed will be automatically preselected.

A further object is to construct a sliding gear transmission in which the shifting is accomplished by the depression of the clutch pedal only and in which the preselection of the next higher speed is automatically made after the shifting has been accomplished and by further depression of the clutch.

With a sliding gear of my constuction the transmission can be set for low speed and upon disengagement of the clutch by means of the foot pedal, the shift to low speed accomplished, and as soon as the shift has been completed and before the clutch is re-engaged, the next or intermediate speed is automatically preselected. Upon again depressing the clutch pedal, the transmission is shifted into intermediate or second speed, and high speed automatically preselected.

The next depression of the clutch pedal will shift the transmission into high speed, after which it can be again set for low or intermediate speeds, and the next depression of the clutch pedal will shift to that speed.

In the drawings:

Fig. 1 is a fragmental sectional view of a motor vehicle showing my device in position;

Fig. 2 is a fragmental sectional view, looking toward the device from the driver's seat;

Fig. 3 is an enlarged top plan view of an automobile transmission with my shifting and preselecting mechanism attached thereto;

Fig. 4 is an enlarged plan view of the mechanism used for the automatic preselection, with the cover removed;

Fig. 5 is a cross-section taken on the line 5—5 of Fig. 4, viewed in the direction of the arrow;

Fig. 6 is a longitudinal section taken on the line 6—6 of Fig. 4;

Fig. 7 is a front elevation of the automatic preselector showing the manner in which the same is tripped;

Fig. 8 is an enlarged horizontal section of the manually operated mechanism employed in setting the selector;

Fig. 9 is an enlarged longitudinal section of the pull-rod showing the manner of mounting the pawl therein;

Fig. 10 is an enlarged view of the mechanism employed for setting the transmission to neutral;

Fig. 21 is an enlarged vertical section of the drum by means of which the preselecting and shifting elements are rotated.

Figure 11:
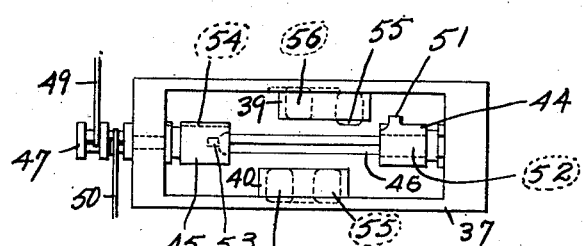
Fig. 11 is a diagrammatic view of the preselecting and shifting mechanism when in position to be shifted to high.
Figure 16:
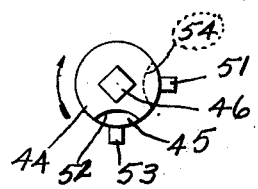
Fig. 16 is an enlarged diagrammatic view showing the position of the preselecting and shifting elements in Fig. 11.

In the construction of my device I employ an automobile having a body provided with a dash 30, a toe-board 31, a floor-board 32, a cowl 33, an instrument-board 34 and the sides 35. Carried by the frame is the ordinary sliding transmission 36, which has mounted thereon a housing 37. Mounted in the housing are slides 38, on which are mounted members 39 and 40. These members carry the shifter forks which engage with certain of the gears in the transmission. The transmission being old, is not shown or described in detail, but may be of either the standard or the universal type, or of any other special type of sliding gear transmission, such as is common on various makes of automobiles.

Slidably mounted in the housing 37 are bars 38ª and 39ª, their foward ends being provided with teeth 40ª, thereby forming racks. These racks mesh with a gear 41, which is interposed between the bars, and when one bar is moved in one direction it will rotate the gear 41 and move the other bar in the opposite direction.

Carried by the bars 38ª and 39ª are forks 42 and 43, which have their bifurcated ends extending into slots formed in the preselectors and shifting elements 44 and 45. These preselecting and shifting elements are mounted on a shaft 46, which is rotatably carried by the housing 37. The shaft 46 projects beyond the housing and has mounted on its projecting end a double sheave wheel 47. Through the flange of this sheave wheel 47, is passed a pin 48, to which are attached chains 49 and 50. The purpose of these chains will be explained in detail later.

The preselecting and shifting element 44 is provided with a projection 51 and with a recess 52, while the preselecting and shifting element 45 is provided with a projection 53 and a recess 54. These preselecting and shifting elements are so mounted that the recess in one element will be in alignment with the projection of the other element. The purpose of these will be explained in detail later.

Formed through the members 39 and 40 are openings in which are located sliding pawls 55 and 56, which are for the purpose of permitting the device to be shifted to neutral.

The sliding bar 38ª has its end projecting beyond the housing 37 and to this projecting end is attached a tooth 57. This tooth is engaged by a slidably mounted dog 58, which is carried by the bar 59. The bar 59 is slidably supported adjacent the housing 37. The dog 58 is held in projected position as illustrated in Fig. 3, by means of the spring 60. The dog is also provided with a pin 61, which engages with the inclined surface of the lug 62ª. This is for the purpose of releasing the tooth 57 when the gear shift has been completed, after which the bar 38ª is pulled back to its starting position by means of the spring 62. The bar 59 is also provided with a boss or extension 63, in which a bumper 64 is slidably mounted. This bumper is held in extended position by means of a coil spring 65.

Carried by the transmission casing is a support 66 in which is slidably mounted a rod 67, which has an adjustable bumper 68 located on its rear end and a bumper 69 on its foward end. This bumper is adapted to trip the automatic preselecting mechanism, as will be hereinafter more fully explained. The preselecting mechanism consists of a housing 70 which is mounted on a support 71 preferably carried by the transmission casing, although if found necessary it may be supported elsewhere.

The housing 70 is provided on each side with ears 72, which are provided with slots 73 through which screws or bolts 74 pass. The purpose of these slots is to permit the adjustment of the housing 70 to take care of any stretch in the chain 50.

Formed integral with the front wall 75 is a sleeve 76, on which is mounted a gear 77. The gear is retained in position on the sleeve by means of a collar 78. This collar has extending therethrough a set screw 79, the end of which also extends into the keyway 80 formed in the reduced end 81 of the pull-rod 82. The reduced end 81 extends through the wall 75 and has located on its end a fork 83 in which the chain 50 is secured. The rear end of the pull-rod 82 is bifurcated as at 83ª, and in this bifurcation is secured a chain 84. The pull-rod 82 has formed therethrough a vertical slot 85, in which is located a pawl 86 which extends above the top of the rod. The pawl is held in extended position by means of a spring 87. The tooth 88, which is formed integral with the pawl and which projects beyond the pull-rod 82, has its rear face inclined as at 89, so that when the rod 82 is pulled in one direction, the pawl will be forced downward. This is necessary in order to set the device.

Carried by the housing 37 and parallel to the pull-rod 82 are shafts 90 and 91, to which gears 92 and 93 are secured. These gears mesh with the gear 77. The pull-rod 82 has projecting from its side a pin 94, which is adapted to contact with pins 95 and 96, carried by the shaft 90. The purpose of this contact will be explained in detail later, while the tooth 89 is designed to contact with pins 97 and 98 carried by the shaft 91. The shaft 90 projects through the wall 75 and has mounted thereon a finger 99. This finger has attached thereto a spring 100, the opposite end of the spring being attached to the transmission casing at any suitable point.

Attached to the finger 99 is a cable 101, which passes around a sheave wheel 102 carried by the casing 37. This cable then extends toward the side of the vehicle and passes around a pulley 103. The free end of the cable is attached to a rod 104, which extends upward and projects through the side of the machine and on the interior thereof, as shown in Fig. 1. This projecting end terminates in a knob 105. This rod is for the purpose of releasing the preselecting mechanism in the event that it is desired to preselect a higher rate of speed than for which the device is set, and without the necessity of shifting gears.

The chain 84 passes around the wheel 106, its free end being attached to a yoke 107 which is pivotally attached to a plate 108. This plate is mounted in the slide 109 and has attached to its upper end a yoke 110 to which is attached a chain 111. This chain passes around the wheel 112 and has its free end attached to the foot lever 113, which is slidably mounted on a plate 114. This plate is attached to the inside of the machine and is for the purpose of setting the device to low speed by means of the foot. The plate is provided with a slot 115 which is only of sufficient length to allow the device to be set to low speed.

Secured to the plate 108 is a second yoke 116, to which is attached a chain 117, this chain passing around a wheel 118. The free end of the chain is attached to a lug 119 projecting from the rod 120. The rod 120 is mounted in a sleeve 121 which is carried by the instrument board 34. The sleeve 121 is provided with a slot 122 through which the lug 119 passes. The rod 120 is provided with a knob 123, by means of which the same can be pulled forward, this providing a manual setting for the device. It is by means of this knob and rod also that the device is set for reverse, as will be more fully described later. Surrounding the sleeve 120 and at the end thereof is a sleeve 124, in which is located a coil spring 125. This coil spring is under a very slight tension and is merely for the purpose of holding the rod 120 against moving backward and thus effectually prevents any slack from being formed in the chains 111 and 117. The sleeve 121 is also provided with a cut-away portion 126, which permits the tooth 127 of the dog 128 to enter the notch 129 formed in the rod 120. The dog 128 is held against vibration by means of a spring 130, and may be raised out of the slot 126 by means of the cam 131. The operation of this cam is controlled by means of a handle or turn-button 132 located on the instrument board, as shown in Fig. 2.

The slide 59 is operated by means of the lever 133, the end 134 of which is pivotally secured to the frame 32ª. Secured to the lever 133 is a rod 135, the opposite end of which is attached to the clutch pedal 136.

Figure 13:
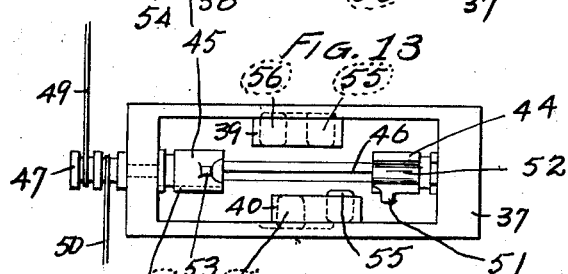
Fig. 13 is a similar view showing the mechanism ready to be shifted to low.
Figure 14:
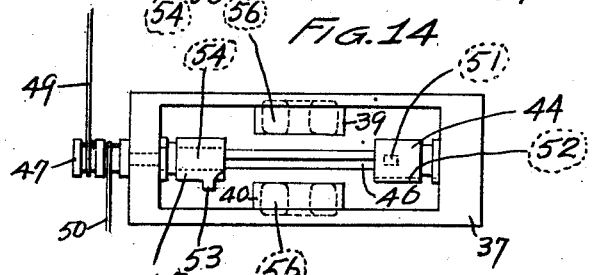
Fig. 14 is a similar view, showing the mechanism in position to be shifted to reverse.
Figure 19:
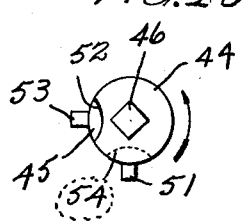
Fig. 19 is a similar view, showing the position of the preselecting and shifting elements in Fig. 14.
Figure 15:
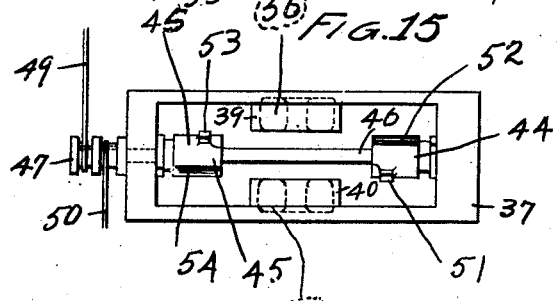
Fig. 15 is a similar view, showing the mechanism when set for neutral.

We will assume that the vehicle is standing still in the garage in neutral and ready to be backed out. The operator starts his engine, releases the brake and grasps the knob 123 and pulls forward as far on the same as he can. This will retract the pull-rod to its fullest extent and in so doing unwind the chain 50 from the sheave wheel 47 and wind up the chain 49. This winding up of the chain will put tension on the spring 137 which has its opposite end secured to the frame 32 and will place the preselector and shifting elements in the positions shown in Figs. 14 and 19. The operator continues to hold out the knob 123 and depresses the clutch pedal. The first movement will be to release the clutch; the next movement will be transmitted from the lever 133 to the slide 59, moving it forward. This forward movement is in turn transmitted to the rod or bar 38ª by means of the dog 58 and from this bar through the agency of the bar 40 and gear 41 to the bar 39ª, causing it to move in the opposite direction. These bars having the forks 42 and 43 attached thereto move the preselecting and shifting elements toward each other simultaneously, and when set as shown in Figs. 14 and 19, the projection 53 will contact with the shifter fork 40, moving it backward so that it will assume the position shown in Fig. 13.

Figure 12:
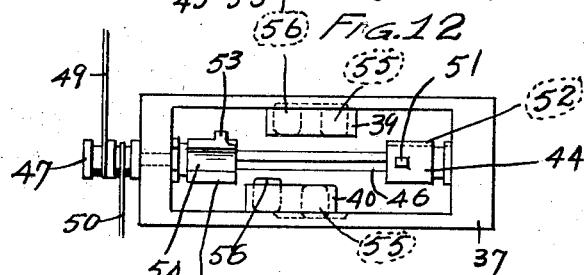
Fig. 12 is a similar view showing the mechanism in position to be shifted to second speed.
Figure 18:
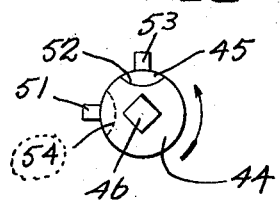
Fig. 18 is a similar view, showing the position of the preselecting and shifting elements in Fig. 13.

As soon as the gear shifting has been completed, the dog 58 is withdrawn and the spring 62 returns the bars 38ª and 39ª and also the preselecting and shifting elements 44 and 45 to their original positions. Then upon releasing the knob 123, the spring 137 will exert a pull on the chain 49, unwinding it, and simultaneously winding up the chain 50. The winding up of this chain, however, will be stopped by the tooth 88 coming in contact with the pin 97. The clutch is now let in and the vehicle starts backward. When backed to the desired distance, the clutch is again depressed and the former operation of moving the shifting and preselecting elements 44 and 45 toward each other by this depression repeated. Of course by the release of the knob 123, and the pulling of the chain, the preselecting and shifting elements have assumed the positions indicated in Figs. 13 and 18, and upon their forward movement the projection 51 comes in contact with the shifter fork 40 and forces it forward, shifting the gears into low speed or as indicated by the position of the shifter fork in Fig. 12.

Figure 17:
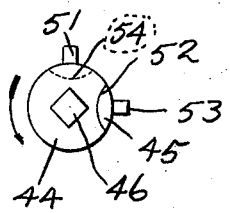
Fig. 17 is a similar view showing the position of the preselecting and shifting elements in Fig. 12.

As soon as the shift has been completed, the preselecting and shifting elements are returned to their starting position. But a further depression of the clutch pedal moves the slide 59 still further forward, permitting the bumpers 64 and 68 to contact and push the rod 67 forward. This forward movement causes the finger 99 to rock and in so doing places the gears 77, 92 and 93 in rotation, lifting the pins 97 and 98 upward and depressing the pins 95 and 96. The pin 95 is now in a horizontal position and the pin 97 has released the tooth 89. The spring 137 causes the pull-rod to move forward, permitting the pin 94 carried by the pull-rod to engage with the pin 95. This permits a partial preselection and upon the re-engagement of the clutch, the spring 100 pulls the finger 99 back to the position indicated, in Fig. 6, which lowers the pins 97 and 98 into the position illustrated in Fig. 5 and raises the pins 95 and 96, as illustrated in the same figure. This permits the tooth 88 to come to rest against the pin 98, and the preselector and shifting elements are now in the position shown in Figs. 12 and 17.

Upon forward movement or disengagement of the clutch, the shifting element 45 will first contact with the sliding pawl 56 and due to the fact that this is out of the groove formed in the side walls of the housing 37, illustrated in Figs. 11 to 15 inclusive, projects beyond the outer surface of the fork, so the first movement will be to shift this fork back to neutral position, or in other words, to a position where the sliding pawl 55 can enter the groove, after which the projection 53 engages the shifter fork 46 and shifts it into the position shown in Fig. 11. After this the previous operation is repeated, which will automatically preselect high speed. The grooves 52 and 54 are for the purpose of permitting the shifting to various speeds, as it will be noted from Fig. 13 that when the shifter fork 40 is moved forward the sliding pawl 56 must necessarily project and if it were not for the groove 54 it would be impossible to complete the shift. If high speed has been reached and the vehicle is moving forward, the operator places his foot on the plate or pedal 113 and pushes it downward as far as it will go. This sets the device for low speed so that at the next depression of the clutch pedal the vehicle will be shifted to low speed.

Figure 20:
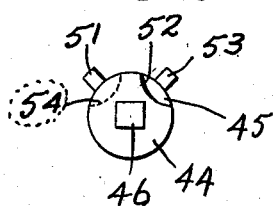
Fig. 20 is a similar view, showing the position of the preselecting and shifting elements in Fig. 15.

It is for this purpose that the pawl 86 is pivotally mounted so that it can be depressed on its backward movement without the necessity of rocking any of the gears. The notch 129 is cut preferably between first and second, and should it be desired to shift into neutral at any time, the knob 132 is turned so as to lower the dog 128 into the slot 126 and upon release of the device after first speed has been set, the rod will be stopped so that the preselecting and shifting elements are in the position indicated in Figs. 15 and 20. Then if either of the forks are in shifted position one of the sliding pawls 55 or 56 will project therefrom, and upon the operation of the clutch the same will engage with these elements and that fork be shifted to neutral, while the other fork already being in neutral, will have none of the pawls projecting therefrom.

Having fully described my invention, what I claim is:—

1. An automatic preselector and shifting device for sliding gear transmissions comprising a pair of rotatable and longitudinally sliding preselecting and shifting elements, means for moving said preselecting and shifting elements toward each other simultaneously, means for moving said elements away from each other simultaneously, means for automatically rotating said elements in one direction, hand or foot operated means for rotating said preselecting and shifting elements in the opposite direction, and means included in the last mentioned means for limiting the movement of the automatic rotating means whereby a preselection is automatically made.

2. An automatic preselector and gear shifting device for longitudinally sliding gear transmissions comprising rotating and sliding preselecting and shifting elements, a clutch disengaging means, means operated by the clutch disengaging means for imparting a sliding movement to the preselecting and shifting elements for shifting the transmission to a preselected speed, means for setting said preselecting and shifting elements to a preselected speed, and means operated by the shifting mechanism for automatically preselecting the next highest speed after the shift has been made.

3. A device of the class described including in combination with combined rotatable and longitudinally sliding preselecting and shifting elements, and a connection between said elements and the clutch pedal of a motor vehicle whereby a preselected gear is shifted when said pedal is depressed, of means for automatically operating the preselecting and shifting means to select the next higher speed after the shift has been completed, and means for resetting the preselecting means to their starting position.

4. A device of the class described comprising a sliding gear transmission including preselecting and shifting elements, and means operated by the depression of the clutch pedal of a motor vehicle for operating said shifting elements so as to shift the transmission to a preselected speed, and means operated by the further depression of the clutch pedal after the shift has been completed for automatically preselecting a higher speed after one shift has been completed.

5. A device of the class described comprising a sliding gear transmission, a clutch pedal, rotatable and slidable preselecting and shifting elements, means operated by the clutch pedal for slidably operating preselecting and shifting elements for shifting a preselected gear, and means operated by the clutch pedal for automatically rotating the preselecting elements thereby preselecting the next highest speed as soon as the shifting has been completed.

6. A device of the class described comprising a sliding gear transmission having rotating and sliding preselecting and shifting elements, means operated by the clutch pedal of a motor vehicle for moving said elements toward each other, means for moving said elements from each other when a shift has been completed, means tending normally to rotate the preselected and shifting elements in one direction, means operated by the hand or foot for rotating said preselecting and shifting elements in the opposite direction, and means included in the last mentioned means for releasing said rotating means whereby said first mentioned rotating means rotates the preselecting and shifting elements a predetermined distance immediately after a shift has been completed whereby a preselection to the next higher speed is automatically made.

7. In a device of the class described comprising the combination with a sliding gear transmission having rotating and longitudinally sliding preselecting and shifting elements, means for operating the same, and means for returning said preselecting and shifting elements to a starting point, of means controlled by the movements of the preselecting and shifting element operating means for automatically preselecting the the next higher speed immediately after a preselected gear has been shifted and before the operating means for the shifting and preselecting means has been returned to its starting position.

8. In a device of the class described a sliding gear transmission and its casing, members provided with gear shifting forks slidably mounted in said casing, a pair of preselecting and shifting elements rotatably and slidably mounted in said casing, a clutch pedal, a lever mechanism operated by the clutch pedal for moving said preselecting and shifting members toward each other when the clutch pedal is moved forward for operating the gear shifting forks, means normally tending to rotate the preselecting and shifting members in one direction, physically operated means for rotating said preselecting and shifting elements in the opposite direction for setting the same to their starting point, and means included in the setting means and operated by the lever mechanism for limiting the rotation imparted to the preselecting and shifting elements by the first mentioned rotating means whereby a preselection to the next higher speed is automatically made after a shift has been completed.

9. In a device of the class described the combination with a sliding gear transmission, a pair of gear shifting elements, a shaft, preselecting and shifting elements slidably mounted on said shaft rotatable therewith and capable of longitudinal movement in opposite directions simultaneously thereon, means for moving said preselecting and shifting elements toward each other, means for moving said preselecting and shifting elements from each other, of means under constant tension for normally rotating said shaft in one direction, means operable from within a motor vehicle for rotating said shaft in the opposite direction, means for holding said shaft in set position, and means for releasing the setting means, step by step, as a preselected gear is shifted whereby a preselection to a next higher speed is automatically made.

10. A device of the class described comprising a sliding gear transmission including preselecting and shifting elements, means operated by the depression of the clutch pedal of a motor vehicle for operating said shifting elements so as to shift the transmission to a preselected speed, means operated by the further depression of the clutch pedal for automatically operating said preselecting means thereby preselecting a higher speed after one shift has been completed, and means whereby the preselection can be advanced without operating the gear shifting means.

11. A device of the class described comprising a sliding gear transmission, a clutch pedal, preselecting and shifting elements, means operated by the clutch pedal for operating preselecting and shifting elements for shifting a preselected gear, means operated by the clutch pedal for automatically operating said preselecting means whereby the next highest speed is selected as soon as the shifting has been completed, and means whereby the preselection can be adavanced without operating the clutch pedal.

12. In a device of the class described comprising a sliding gear transmission having rotating and sliding preselecting and shifting elements, means for slidably operating the same, means for rotatably operating the same and means for setting said preselecting and shifting elements to a starting point; of means operated by the slidably operating means for automatically rotating the preselecting means to select the next higher speed immediately after a preselected gear has been shifted, and means whereby the preselection can be advanced without operating the gear shifting means.

13. A device of the class described comprising a sliding gear transmission including rotating and sliding preselecting and shifting elements, and means operated by the depression of the clutch pedal of a motor vehicle for slidably operating said shifting elements so as to shift the transmission to a preselected speed, means operated by the further depression of the clutch pedal for automatically rotating said elements thereby preselecting a higher speed after one shift has been completed, means whereby the preselection can be advanced without operating the gear shifting means, and means whereby said preselecting elements can be set to shift to neutral.

14. In a device of the class described comprising a sliding gear transmission having rotating and sliding preselecting and shifting elements, means for slidably operating the same, and means for setting said preselecting and shifting elements to a starting point; of means adapted to be operated by the preselecting and shifting element operating means for automatically rotating the same thereby preselecting the next higher speed immediately after a preselected gear has been shifted, means whereby the preselection can be advanced without operating the gear shifting means, and means whereby said preselecting elements can be set to automatically shift to neutral.

In testimony whereof I have affixed my signature.

JASPER BLACKBURN.